United States Patent [19]

Domel

[11] Patent Number: 4,735,374

[45] Date of Patent: Apr. 5, 1988

[54] AUTOMATIC LOADING HUB FOR SUPPLY REEL ON REEL TO REEL TAPE DRIVE AND METHOD

[75] Inventor: Douglas R. Domel, Fort Collins, Colo.

[73] Assignee: Hewlett-Packard Company, Palo Alto, Calif.

[21] Appl. No.: 904,991

[22] Filed: Sep. 8, 1986

[51] Int. Cl.$^4$ ............................................. B65H 16/04
[52] U.S. Cl. .................................... 242/68.3; 242/195; 242/57
[58] Field of Search ........................ 242/57, 68.3, 68.1, 242/68.2, 179, 195; 360/71, 90, 132, 134

[56] References Cited

U.S. PATENT DOCUMENTS

| | | | |
|---|---|---|---|
| 3,645,464 | 2/1972 | Herger et al. | 242/68.3 |
| 3,825,203 | 7/1974 | Kutos et al. | 242/68.3 |
| 4,243,186 | 1/1981 | Peter et al. | 242/195 |
| 4,456,209 | 6/1984 | Calizano et al. | 242/68.3 |

FOREIGN PATENT DOCUMENTS

| | | | |
|---|---|---|---|
| 130843 | 10/1981 | Japan | 242/179 |
| 182154 | 10/1983 | Japan | |

*Primary Examiner*—John M. Jillions
*Attorney, Agent, or Firm*—Jeffery B. Fromm

[57] ABSTRACT

A supply reel hub for use on a computer tape drive for assuring that a supply reel is squarely locked down and properly aligned on the computer tape drive. The supply hub comprises a locking means in the form of three L-shaped feet for locking the supply reel securely in place, a plurality of spaced apart sensing means and a plurality of signalling means which sense and signal to a controller whether each of the three L-shaped feet of the locking means are properly in position. A centering knob positioned on the top of the supply hub has been provided so that a supply reel may be easily centered over the supply hub. A groove is positioned on the base of the supply hub to allow a write enable tab to slip off of the supply hub and not hang up on the centering knob. Additional sensing means are provided for sensing whether there is a write enable ring on the supply reel. Means for releasably attaching the shaft of the drive motor to the hub base which reduces tape edge damage is also provided. The positioning of the L-shaped feet is checked on loading and unloading and in the event of improper positioning of the L-shaped feet, an error message is displayed on the computer tape drive and may also be displayed on the computer. A method of assuring the locking and unlocking of the hub is also disclosed.

16 Claims, 3 Drawing Sheets

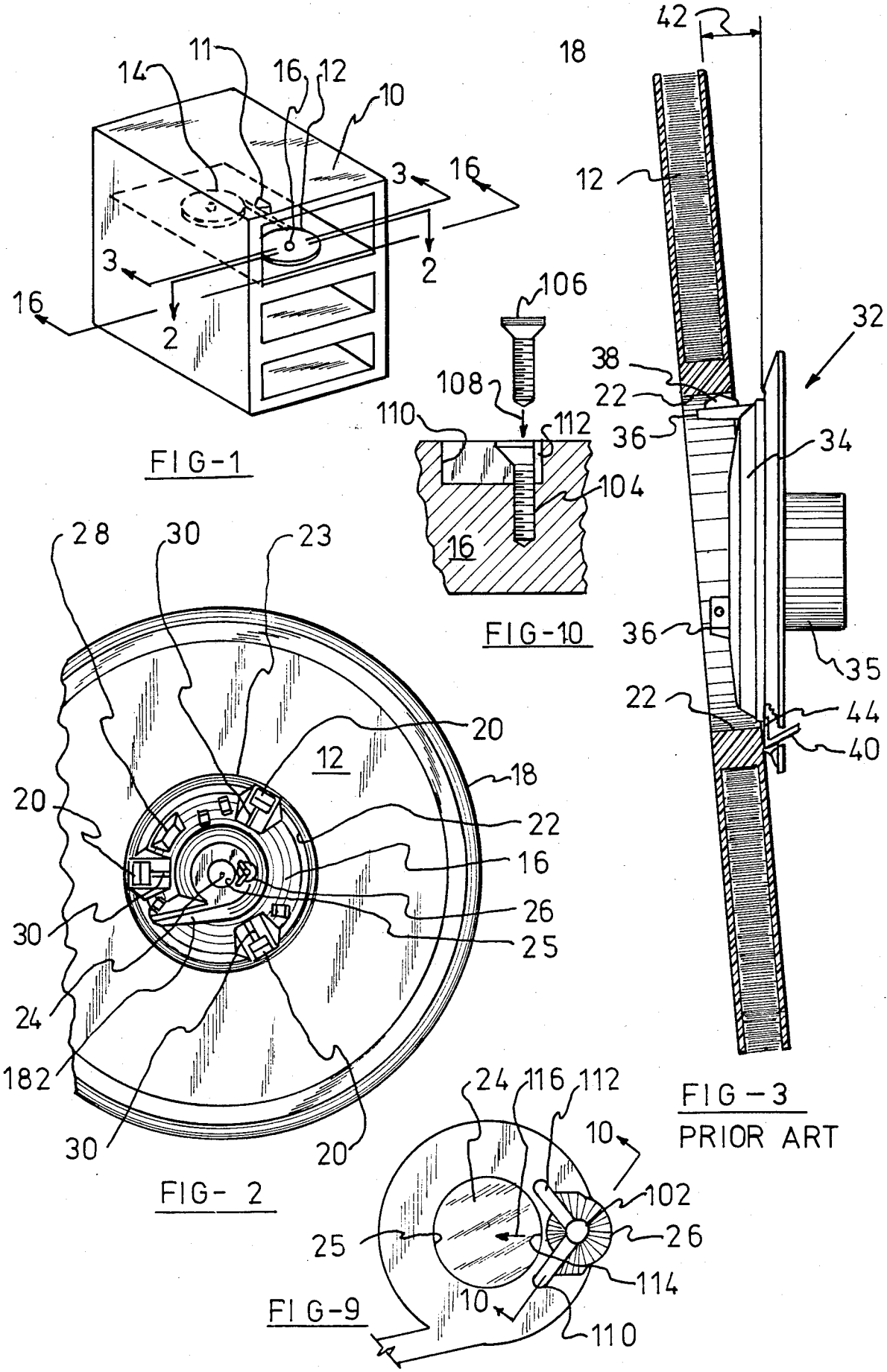

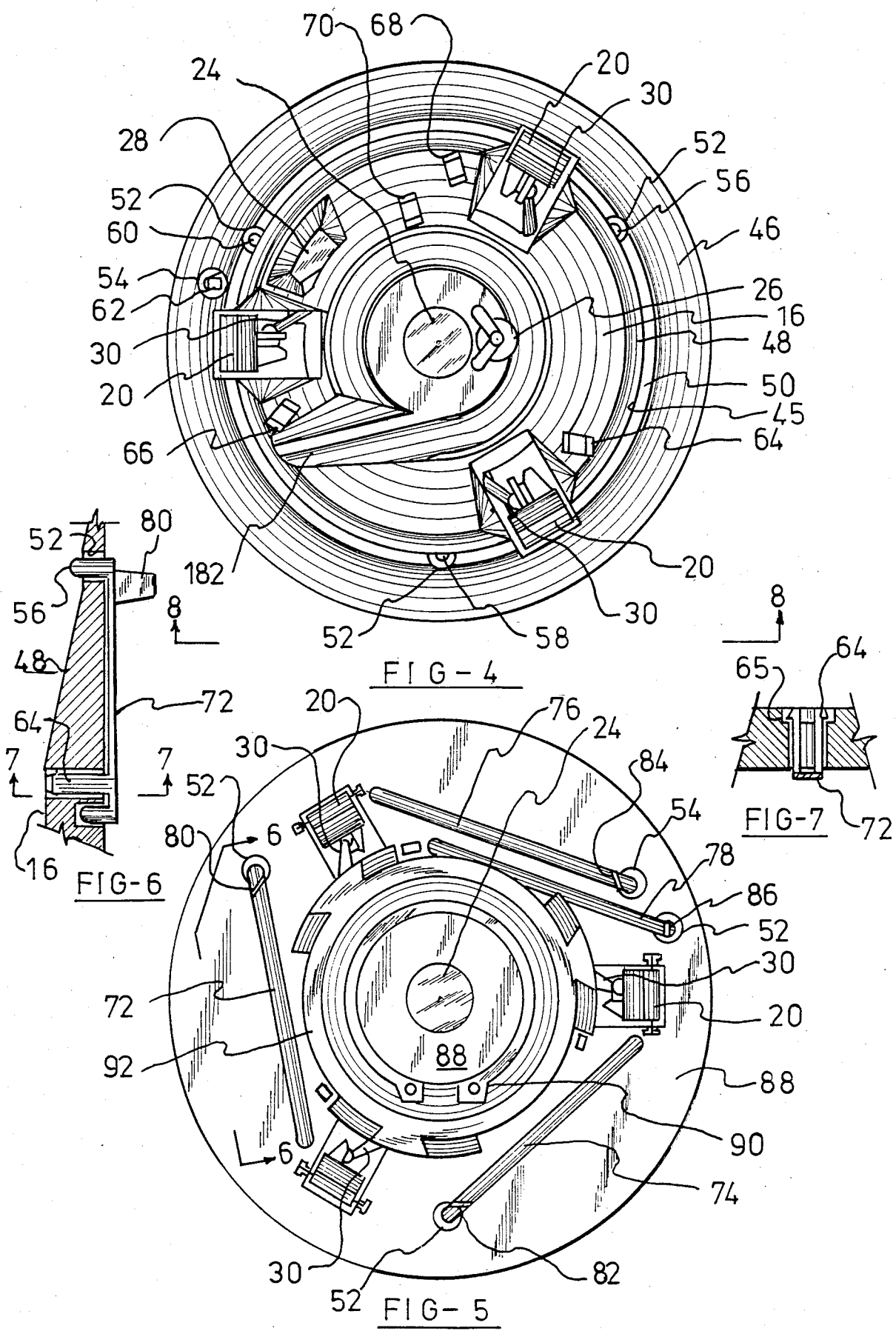

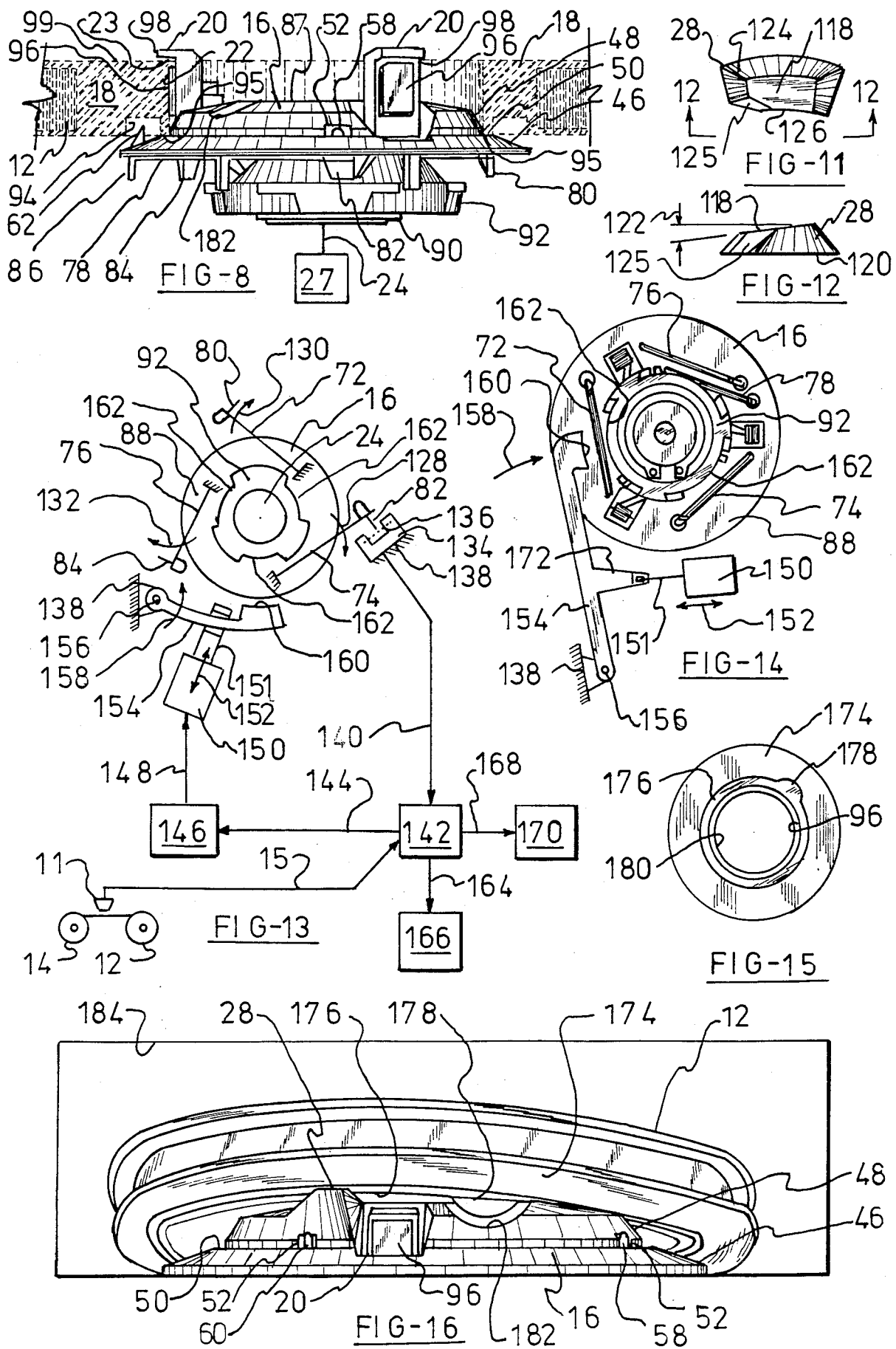

AUTOMATIC LOADING HUB FOR SUPPLY REEL ON REEL TO REEL TAPE DRIVE AND METHOD

BACKGROUND OF THE INVENTION

This invention relates generally to supply hubs for use on a supply reel in a reel to reel computer tape drive and more particularly to a new and novel supply hub for a supply reel which assures locking of the supply reel onto the supply hub. Computer tape drives which are positioned in an upright manner for access to the computer tapes or in a horizontal configuration for a maximum number of tapes in a minimum area have long been used in the computer industry. Generally, the magnetic tape supply reel is secured to a supply hub and the free end of the supply reel tape is threaded past a head and then secured to a take up reel which is attached to a take up hub.

In order to facilitate the securing of the supply reel onto the supply hub, there have been used supply hubs with reel engaging pawls, a centering knob and a single sensing mechanism for determining if the supply reel is centered and secured onto the supply hub. One such supply reel is disclosed in U.S. Pat. No. 4,243,186, manufactured by Cipher Data Products, Inc. of San Diego, Calif. Such supply hubs have several problems. First, it often appears at first glance that the supply tape reel is properly positioned and aligned on the supply hub, when, in fact, it is not. One side of the supply reel may be properly positioned against the supply hub and has been sensed as being in position while the other side of the supply reel is not properly aligned. Secondly, the centering knob does not allow for the mounting of six-inch reels as the inner hub of the six-inch reels cannot be positioned over the centering knob. Furthermore, in the case where the supply reel is not properly positioned on the supply hub, there is no error message transmitted to the computer or computer tape drive, rotation of the tape is continued, often resulting in tape damage. It has also been encountered that when the supply reel has a write enable ring with a tab on it, upon loading of the supply reel onto the supply hub, the tab may become caught on the centering knob.

Consequently, it would therefore be advantageous to have a supply reel hub which would assure locking of the supply reel onto the supply hub in order to prevent tape damage and for safety reasons.

SUMMARY OF THE INVENTION

In order to overcome problems inherent in the beforementioned devices, there has been provided by the applicant's invention a new and novel supply hub for use on a supply reel used on a computer with a tape drive, which comprises a locking means in the form of three L-shaped feet that assure that the reel is locked down squarely as well as in place, a plurality of spaced apart sensing means and a plurality of signalling means which sense and signal to a controller whether each of the three L-shaped feet of the locking means are properly in position. There has further been provided by applicant's new and novel supply hub a centering knob which assures that a six-inch reel may be properly mounted on the supply hub. A groove has also been positioned on the base of the supply hub to allow a write enable tab to slip over the supply hub and not hang up on the centering knob upon loading of the supply reel. An additional sensing means has been provided for sensing whether there is a write enable ring on the supply reel. There has also been provided further assurance against tape edge damage by the manner in which the hub base is positiond over the shaft of the drive motor.

Accordingly, it is an object and advantage of the invention to provide a supply hub for use in a computer tape drive which will ensure locking of the supply reel to the supply hub and assures the proper alignment of the supply reel.

Another object and advantage of the invention is to provide multiple sensing means for assuring that the supply reel is properly positioned at multiple positions around the supply hub.

Yet another object and advantage of the invention is to provide a centering knob for use on the supply hub which will allow the mounting of six-inch reels onto the supply hub.

Yet another object and advantage of the invention is to provide a means for releasably attaching the shaft of the drive motor to the supply hub whereby one side of the central opening of the hub base may be tightened, thereby improving perpendicularity and ensuring less edge damage to a supply tape.

Still yet another object and advantage of the invention is to provide a new and novel centering means positioned on the hub to ensure that six-inch reels may be mounted on the supply hub.

Still yet another object and advantage of the invention is to provide a groove on the hub base to ensure that a write enable ring tab will not become stuck on the hub base.

Still yet another object and advantage of the invention is to provide a supply hub with an additional sensing means for sensing the absence or presence of a write enable ring on the supply tape.

These and other objects and advantages of the invention will become apparent from a review of the drawings showing the invention and from a reading of the description of the preferred embodiment, which has been given by way of illustration only.

BRIEF DESCRIPTION OF THE DRAWINGS

FIG. 1 is a perspective view of a conventional computer tape drive unit.

FIG. 2 is an elevational view, taken through line 2—2 of FIG. 1, showing applicant's novel supply reel hub attached to a supply reel.

FIG. 3 is a cross-sectional view, taken through line 3—3 of FIG. 1, showing a prior art type supply hub assembly and showing a misaligned supply reel attached thereto.

FIG. 4 is an enlarged top plan view of applicant's supply reel hub similar to FIG. 2, showing the hub assembly with the supply reel removed.

FIG. 5 is a bottom plan view of the supply hub assembly shown in FIG. 4 and showing the reverse side thereof.

FIG. 6 is a cross-sectional view taken through line 6—6 of FIG. 4, showing a typical sensing member.

FIG. 7 is a cross-sectional view taken through line 7—7 of FIG. 6.

FIG. 8 is a side elevational view of applicant's supply reel hub, showing in dashed lines a supply reel as it is positioned on the hub assembly.

FIG. 9 is an enlarged top plan view showing the center portion of the supply hub assembly, and in particular, showing greater detail on the hub attaching means.

FIG. 10 is a cross-sectional view, taken through line 10—10 of FIG. 9.

FIG. 11 is a top plan view of the centering member used on applicant's supply reel hub.

FIG. 12 is a side elevational view of the centering member of FIG. 11.

FIG. 13 is a schematic view of the locking hub system.

FIG. 14 is a bottom plan view of the supply reel hub assembly similar to FIG. 5, and showing the actuator arm used in the locking hub system.

FIG. 15 is a bottom plan view of a supply tape reel with a write enable ring shown in position.

FIG. 16 is a front elevational view taken along line 16—16 of FIG. 1, showing the computer tape drive.

DESCRIPTION OF THE PREFERRED EMBODIMENT

Referring now to the drawings in general, and in particular to FIG. 1 of the drawings, there is shown a perspective view of a conventional computer tape drive unit, shown generally by the numeral 10. Shown on the tape drive 10 is a supply reel 12 and a take up reel 14. Positioned in the center of the supply reel 12 is applicant's new and novel supply reel hub 16 which secures the supply reel 12 to the tape drive 10.

Referring now to FIG. 2, there is shown an elevational view taken through line 2—2 of FIG. 1 showing the applicant's supply hub as it is attached to the supply reel. The supply reel 12 includes a plastic case 18 wherein the magnetic computer tape is wound. Positioned on applicant's supply reel hub 16 are three generally L-shaped feet 20 which are positioned 120 degrees apart from one another. The generally L-shaped feet 20 are adapted to securely engage the inside circumference of the plastic case 22. The bottom leg of the L-shaped foot 20 engages the rim of the inside circumference of the plastic case 23 such that the supply reel 12 is locked firmly onto the supply reel hub 16 by means of the feet 20 locking over the rim of the inside circumference of the plastic case 23. Positioned in the center of the supply reel hub is a hole 25 for receiving the drive motor shaft 24. Positioned in proximity to the hole in the supply reel hub 25 is a hub attaching means 26 in the form of a single hex key receiving member, having two extensions therefrom, which will be described in greater detail with reference to FIGS. 9 and 10. Also shown positioned on the supply reel hub 16 and formed integrally therewith is centering member 28 which is a generally frusto-conical shaped member having a generally flat upper surface that is substantially parallel to the surface of the supply reel hub 16. The centering member will be described more fully with reference to FIGS. 11 and 12. In FIG. 2 also shown engaging the feet 20 are bar-bell shaped structural legs 30. The top ball of the structural leg 30 engages the feet 20 and the bottom ball of the structural leg 30 is positioned in a locking mechanism to open or retract the feet 20. A locking mechanism on the rear of the supply hub which causes the structural leg 30 to open or close the feet 20 may be similar to the type disclosed in U.S. Pat. No. 4,243,186 to Cipher Data Products Inc., a portion of such a locking mechanism is also shown in FIG. 5 of the drawings.

FIG. 3 is a partial cross-sectional view, taken through line 3—3 of FIG. 1, showing a prior art type hub assembly and showing a misaligned supply reel attached thereto. The prior art type supply reel hub is shown generally by the number 32. The prior art type supply hub 32 comprises generally a circular hub member 34 having a plurality of feet 36 positioned on the circular hub member 34. Positioned on each of the plurality of feet 36 is a plastic cushion 38 for engaging the foot 36 against the supply reel 12. The prior art type foot 36 is generally linear and is not adapted to engage the rim of the inside circumference of the plastic case 23 as shown in FIG. 2, but rather pushes against the inside circumference of the supply reel 22. Also shown in FIG. 3 is a single sensing means 40 for sensing if one of the plurality of feet 36 is positioned properly. Applicant's supply reel hub comprises three sensing means, as will be described more fully in reference to FIGS. 4 and 5. In FIG. 3, there is shown how in the prior art supply reel hub 32 the single sensing means 40 may sense that one foot 36 is in proper position. However, as shown at number 42 there is an angle of displacement which has been slightly exaggerated for the purposes of illustration showing that the supply reel hub may in fact be misaligned with no detection of an error condition in the prior art supply reel hub assembly. In FIG. 3 there is shown only one actuation point of the sensor 44 at the bottom of the supply reel hub 32. The top of the supply reel hub 32 is displaced from the supply reel 12 as no sensing means has been provided to sense the position of the feet 36 at this portion of the supply reel hub 32.

Referring now to FIG. 4, there is shown an enlarged top plan view of applicant's supply reel hub. The supply reel hub is shown generally by the numeral 16, the supply reel hub 16 has a generally circular hub base 45, the hub base 45 having a first sloped surface 48 and a second sloped surface 46. In between the first sloped surface 48 and the second sloped surface 46 is a circumferential ring 50. Positioned around the circumferential ring 50 at 120 degrees apart are three holes for the sensing means 52 and within each of the holes of the sensing means 52 is positioned a probe tip 56, 58, and 60. As the supply reel hub 16 is rotated at a set speed, the combination of the holes for the sensing means 52 and the corresponding probe tips 56, 58 and 60 contact an inner annular surface of the reel shown at 95 in FIG. 8 directly under the circumferential ring 50 on the supply reel hub 16. Shown in proximity to each of the feet 20 are shown the bifurcated ends 64, 66 and 68 for locking each of the sensing members 72, 74 and 76 in FIG. 5 in position, as will be described in greater detail with reference to FIGS. 5, 6 and 7. Also shown in FIG. 4, is a similar arrangement for a write enable sensor, wherein the hole for the write enable sensor is shown at number 54 with a corresponding probe tip 62 having a corresponding bifurcated end 70.

In FIG. 5, there is shown a bottom plan view of applicant's hub assembly, shown in FIG. 4, which shows the reverse side thereof. On the back surface 88 of applicant's supply reel hub, there are shown elongated sensing members 72, 74 and 76, one end of each of the sensing members 72, 74 and 76 is positiond through holes 52. At the end of the sensing members 72, 74 and 76, which are positioned through holes 52, there are positioned corresponding sensing protrusions 80, 82, and 84. The sensing protrusions 80, 82, and 84 are positioned on the opposite side of the holes 52 from their corresponding probe tips 56, 58, and 60 in FIG. 4. In this manner, each of the sensing protrusions 80, 82 and 84 provide a signalling flag to indicate that the corresponding probe tips 56, 58 and 60 are each in proper position and in contact with the inner annular surface of the supply reel 95 in FIG. 8. There is also a corresponding sensing protrusing 86 positioned on sensing member 78 used in combination with probe tip 62 in FIG. 4 for sensing if a write enable ring is positioned on the supply reel. Each of the sensing protrusions 80, 2, 84 and 86 interrupt an optical sensor, as will be described in greater detail with reference to FIG. 13. It can be seen, therefore that each of the sensing protrusions 80, 82, 84, and 86 are checked to ensure that each of the probe tips 56, 58, 60, and 62 in FIG. 4 are properly positioned so that the problem of a single sensing means falsely indicating that the supply hub is properly positioned on the supply reel has been overcome. Also shown in FIG. 5 on the back surface 88 of the supply reel hub, is a split locking ring 90 and a standard locking mechanism 92 for engaging the feet 20 and locking the supply reel hub 16 in FIG. 4 onto the supply reel.

In FIG. 6, there is shown a cross-sectional view taken through line 6—6 of FIG. 5, showing a typical sensing member. All of the sensing member 72, 74, 76; and 78 for sensing the write enable ring, all shown in FIG. 5, operate in the same manner, so that FIG. 6 is illustrative of a typical sensing member 72. Shown in FIG. 6 is an elongated sensing member 72, having at one end its corresponding probe tip 56. Probe tip 56 is positioned through hole 52 and thus protrudes slightly above the sloped surface 48 on the top of the supply reel hub 16. Across from the probe tip 56 is sensing protrusion 80 which is on the other side of hole 52 and protrudes from the underside of the supply reel hub 16. At the other end of elongated sensing member 72, opposite to the end where the probe tip 56 is attached, there is attached a bifurcated end 64 for locking the elongated sensing member 72 in place on the supply reel hub 16.

Referring now to FIG. 7, there is shown a cross-sectional view taken through line 7—7 of FIG. 6. Greater detail on the bifurcated end 64 is shown as it locks elongated sensing member 72 in position as bifurcated end 64 is locked against the edges of hole 65. Thus it can be seen, that bifurcated end 64 cannot slip out of the end of hole 65 and thus securely locks sensing member 72 into position.

FIG. 8 is a side elevational view of applicant's supply reel hub, showing in dashed lines a supply reel positioned on the supply reel hub assembly. The motor shaft 24 is connected to drive motor 27 as shown diagramatically in FIG. 8. The drive motor 27 rotates the supply reel 12. In FIG. 8, there is shown in dashed lines a plastic case 18 of a supply reel 12 having a circular indentation 94 wherein a write enable ring would be positioned on the supply reel 12 if it is desired. As can be seen then in FIG. 8 there is elongated sensing member 78 having attached at one end the corresponding sensing protrusion 86, and across from sensing protrusion 86 on the top surface 87 of the supply reel hub is probe tip 62. Probe tip 62 then engages the circular indentation 94 in the supply reel to sense if there is a write enable ring on the supply reel 12. In a similar manner, on the right side of FIG. 8 there is shown a supply reel 12 also in dashed lines. On the right side of FIG. 8, there is shown the inner annular surface 95 of the supply reel 12 which functions in a manner similar to circular indentation 94 shown on the left side of FIG. 8. Probe tip 58 seen on FIG. 8, then, upon rotation, would contact the inner annular surface 95 of the supply reel 12. If the supply reel 12 is not properly positioned on the supply reel hub 16, the probe tip 58 would not come in contact with the inner annular surface 95 of the supply reel and, therefore, sensing protrusion 82 would not be activated. In applicant's new and novel supply reel hub, all three of the sensing protrusions must be activated, thereby ensuring a proper positioning of the supply reel 12 on the supply reel hub 16 in three different locations. It is also shown in FIG. 8 how the feet 20 have a pad 96 for engaging the inside circumference 22 of the plastic case 13 of the supply reel and further that the leg 20 has a lip 98 which tightly secures the top edge 99 of the supply reel 12 at the rim of the inside circumference of the plastic case 23.

Referring now to FIG. 9, there is shown an enlarged top plan view showing the center portion of the supply reel hub, and in particular, there is shown greater detail on the hub attaching means 26. The hub attaching means 26 comprises a drilled hole 102 and a tapped hole 104, shown in FIG. 10. The drilled hole 102 has elongated slots 110 and 112 positioned around one side of the hole 25. Elongated slots 110 and 112 provide a weakened thin wall section 114 in proximity to one side of the hole 25 in the supply reel hub around the motor shaft 24. In FIG. 10, there is shown a cross-sectional view taken through line 10—10 of FIG. 9. In FIG. 10, as bolt 106 is positioned into tapped hole 104 in the direction as shown by arrow 108, the tightening of the bolt 106 serves to push out the weakened thin wall section 114 in FIG. 9 in the direction shown by arrow 116 in FIG. 9 so that the hole 25 in the supply reel hub 16 tightens around the drive motor shaft 24. This manner of tightening the hole 25 in the supply hub around the drive motor shaft 24 at the weakened thin wall section 114 serves to improve perpendicularity and thereby ensures less edge damage to a supply reel tape.

Referring now to FIG. 11, there is shown a top plan view showing greater details of the centering member used on applicant's supply reel hub assembly. The centering member, shown generally by the number 28 is generally frusto-conical in shape, having an upper surface 118. The distance across the upper surface 118, particularly the length and slope, as will be explained further with reference to FIG. 12, are designed to allow a tape reel to pass over the top of the centering member 28, and also the write enable tab on a supply reel tape does not get hung up on the supply reel hub assembly as will be explained further with reference to FIG. 16. Also shown in FIG. 11 is short side surface 126, having at one end a nick 125. The short side surface 126 with its nick 125 has been adapted to accommodate a smaller six-inch reel, whereby the nick 125 fits into the inner diameter of a six-inch reel such that if a six-inch reel is positioned askew in the tape drive, the nick 125 will engage the inner diameter of the six-inch reel, sliding it into proper position upon rotation. Also, short side surface 126 is angled to grab the inner circumference of a supply reel. Experimentation has shown if the angle of the short side surface 126 were shallower, it would not grab the supply reel and pull it along during mounting of the supply reel tape. The centering member 28 also has a long side surface 124 across from the short side surface 126. The angle of the long side surface 124 is to provide a smooth continuation of the bottom surface 120 of the centering member 28 in FIG. 12, and with the smooth continuation, forms an integral positioning of the centering member 28 on the supply reel hub.

FIG. 12 is a cross-sectional view taken through line 12—12 of FIG. 11 also showing the centering member used on the supply reel hub. In FIG. 12, it can be seen that the upper surface of the centering member 118 and the bottom surface of the centering member 120 are substantially parallel. However, the upper surface 118 and the bottom surface 120 are displaced by angle 122. The angle 122 is approximately 2 degrees, and, as explained with reference to FIG. 11, the slope of the upper surface of the centering member 118 allows a supply tape to pass over the top of the centering member 28 and the write enable tab of the supply tape does not get hung up on the centering member 28.

In FIG. 13, there is shown a schematic view of applicant's locking hub system. FIG. 13 shows the back surface 88 of the supply reel hub with signalling flags 80, 82 and 84. Arrows 128, 130 and 132 indicate the rotation of signalling flags 82, 80 and 84. As seen at arrow 128, the signalling flag 82 is cutting through optical beam 136 of optical interrupter 134. In the preferred embodiment, the optical interrupter 134 is an emitter detector which is normally "on." A typical emitter detector which may be used is Honeywell HOA 1882. As the signalling flag 82 goes through optical beam 136 of the optical interrupter 134, the optical interrupter 134 goes "off". Thus, if each of the plurality of the signalling flags 80, 82 and 84 do not break through optical beam 136 an error condition is detected. The optical interrupter 134 is positioned on the frame 138 of the locking hub system. As optical beam 136 is broken by signalling flag 82 and optical interrupter 134 goes "off," a signal is transmitted through transmission line 140 from the optical interrupter 134 to the controlling means in the form of a master controller 142. A typical master controller which may be used is a Motorola MC6809. The master controller 142 may send a signal across transmission line 168 to the computer 170 indicating that the computer 170 may continue its loading operation, or alternatively, that an error exists and operations involving the tape drive must stop. The master controller 142 also sends a signal across transmission line 164 to a display and user interface 166. Thus, the master controller 142 sends a signal which causes the display of an error condition directly on the tape drive. This operation of sensing if a signalling flag 82 has broken the optical beam 136 and the optical interrupter 134 sending a signal to the master controller 142 and the master controller 142 signalling an error condition on the display 166 on the tape drive is done both upon loading and unloading of the suply reel tape. If the master controller 142 has received proper signals from the optical interrupter 134 that the signalling flags 80, 82 and 84 have passed through the optical beam 136, then the master controller 142 signals through transmission line 144 to a power supply 146. The power supply 146 then transmits voltage across transmission line 148 to a solenoid 150. The arm of the solenoid 151 then moves in the direction of arrow 152 and engages actuator arm 154. Actuator arm 154 is mounted by pin 156 and, upon being pushed by solenoid arm 151, the actuator arm 154 moves in the direction of arrow 158 causing the engaging surface 160 of the actuator arm 154 to engage the mating surface 162 of the locking mechanism 92. In the preferred embodiment, therefore, the activating means which activates the locking mechanism 92 on the supply reel hub 16 is a combination of the power supply 146 which applies voltage to solenoid 150, thus extending the solenoid arm 151 to engage the actuator arm 154.

Also referring to FIG. 13, upon unloading the supply reel from supply hub 16, the supply reel is rotated in reverse. By known means, the read/write path of the tape is sensed by sensor 11 in FIG. 13, which is positioned between the supply reel 12 and the take up reel 14. Sensor 11 determines if there is tape in the read/write path or if all the tape is on the supply reel 12. If all the tape is on the supply reel 12, a singal is sent through transmission line 15 to the master controller 142 indicating that the supply reel 12 is in an unload condition. The master controller 142 signals to the power supply 146. Voltage is applied to the solenoid 150 and the solenoid arm 151 engages contact with the actuator arm 154. The engaging surface 160 of the actuator arm 154 engages contact with the mating surface 162 of the locking mechanism 92 thereby locking the locking mechanism 92 in its reversed position, stopping rotation of the supply reel 12 and retracting feet 20 in FIG. 8 back into the supply hub 16. In the case of unloading, one of the signalling flags 80, 82 or 84 does not break the optical beam 136 of the optical interrupter 134. Therefore a signal is sent to the master controller 142 that the feet 20 in FIG. 8 are retracted into the supply hub 16 and operation of the tape drive assembly is terminated at which point the supply reel 12 can be removed from the supply hub 16.

Referring now to FIG. 14, there is shown a bottom plan view of the supply reel hub assembly similar to FIG. 5, and showing in greater detail the operation of the actuator arm. In FIG. 14, it can be seen that actuator arm 154 is mounted by pin 156 and at one end of actuator arm 154 there is an engaging surface of the actuator arm 160 which engages its mating surface 162 on the locking mechanism 92. The actuator arm 154 has an arm 172 extending therefrom. As solenoid 150 activates and extends solenoid arm 151 in the direction shown by arrow 152, arm 172 causes the actuator arm 154 to be moved in direction 158 whereby the engaging surface of the actuator arm 160 then engages its mating surface 162 on the locking mechanism 92.

FIG. 15 is a bottom plan view of the supply tape reel with a write enable ring shown in position. The underside of the tape 174 has positioned thereon a write enable ring 176 and the write enable ring 176 has formed thereon a tab 178. The write enable ring 176 is positioned in a groove in proximity to the inner circumference of the tape 180.

Referring now to FIG. 16, there is shown how the tab 178 of the write enable ring 176 is allowed to pass through groove 182, thereby allowing the supply reel 12 to be easily mounted onto the supply reel hub 16. It has been seen through experimentation that often the tab 178 of the write enable ring 176 becomes bent after periods of use and when this occurs, as the supply reel 12 is being mounted onto the supply reel hub 16, the tab 178 of the write enable ring 176 can become hung up on the centering member 28. When this occurs, the supply reel 12 is rotated and the tab 178 of the write enable ring 176 is allowed to freely pass through groove 182 and thus the supply reel 12 is allowed to be easily loaded onto the supply reel hub 16 and through the opening in the tape drive unit 184.

Also disclosed is a method of assuring locking of a supply reel to a computer tape drive by means of a supply hub in which a supply hub having a hub base and a plurality of locking means are provided. A plurality of elongated spaced apart sensing means are positioned around the periphery of the hub base and the elongated sensing means have sensing protrusions which extend partially out of the supply hub and contact the supply reel whenever the supply reel is properly positioned in a predetermined position. Activating means are also provided which are in contact with the plurality of locking means for activating the locking means to lock the supply reel onto the supply hub. In the preferred embodiment, the activating means comprises a power supply which applies voltage to a solenoid and the solenoid arm engages an actuator arm which engages a portion of the locking mechanism. Also provided is a controlling means for controlling the operation of the computer tape drive. A plurality of signalling means are formed on one end of the elongated sensing means for signalling to the controlling means that each of the plurality of sensing protrusions are properly positioned in a predetermined position to indicate that the supply reel is properly aligned. The supply hub is positioned on the computer tape drive and the supply reel is then positioned and centered onto the supply hub.

If the supply reel is properly positiond and aligned, the activting means activate the locking means and the supply reel is locked onto the supply hub if the locking means are properly positioned in the predetermined position on the supply reel. In the event that the locking means are not properly positioned in the predetermined position on the supply hub, an error message is displayed on the computer tape drive. In addition to displaying an error message on the computer tape drive when the locking means are not properly positioned in the predetermined position of the supply hub, a signal may also be sent to a computer used with the computer tape drive and an error message may be displayed on the computer also.

The method of assuring locking of a supply reel to a computer tape drive by means of a supply hub with additional steps to assure unlocking of the supply reel from the supply hub is also provided, whereby, a second sensing means is provided to sense whether there is tape remaining on the tape path between the supply reel and the take up reel. When there is no tape in the tape path, all the tape is on the supply reel indicating an unlock condition. Transmission means are also provided for signalling to the controlling means that there is no tape on the tape path. To unlock the supply reel from the supply hub, the supply reel is rotated in reverse; the second sensing means senses whether there is tape in the tape path; when there is no tape in the tape path, the transmission means signals to the controlling means that there is no tape on the tape path. A signal is sent from the controlling means to the activating means to indicate that the supply reel is in unload condition and the locking means are activated to retract into the supply hub. One of the plurality of spaced apart sensing means senses whether the locking means are properly retracted into the supply hub and a signal is sent from one of the plurality of signalling means to the controlling means to indicate that the locking means are properly retracted into the supply hub. At this point, operation of the tape drive ceases and the supply tape can be removed from the supply hub.

I claim:

1. A hub assembly with a locking mechanism for use on a supply reel of a computer tape drive, the supply reel having an inner circumference with a rim used on a computer with a tape drive having a frame, the assembly being used to assure proper alignment of the supply reel on the hub, comprising:
   (a) a drive motor having a shaft for turning the supply reel;
   (b) a hub base having a periphery with a central opening and having means for releasably attaching the shaft of the drive motor to the hub base;
   (c) locking means positioned on the hub base for locking the hub base to the supply reel;
   (d) a plurality of elongated spaced apart sensing means, positioned around the periphery of the hub base in a predetermined position, the elongated sensing means having sensing protrusions extending partially out of the hub to contact the supply reel whenever the reel is properly positioned;
   (e) activating means fixedly attached to the frame and in contact with the locking means for activating the locking means to lock the supply reel onto the hub; and
   (f) a plurality of signalling means, formed on one end of the elongated sensing means for signalling to the computer tape drive that each of the plurality of sensing protrusions is positioned properly in a predetermined position to indicate that the supply reel is properly aligned.

2. The hub for use on a supply reel as defined in claim 1 wherein the locking means is three generally L-shaped feet, the L-shaped feet adapted to engage the rim edge of the inner circumference of the supply reel.

3. The hub for use on a supply reel as defined in claim 1 wherein the means for releasably attaching the shaft of the drive motor to the hub base comprises:
   (a) a screw receiving member having two projections positioned partially around one side of the central opening in the hub base, and having a weakened section; and
   (b) whereby the central opening of the hub base may be tightened at the weakened section to improve perpendicularity and thereby ensure less edge damage to a supply tape.

4. The hub for use on a supply reel as defined in claim 1 further comprising:
   (g) centering means positioned on the periphery of the hub base for centering the supply reel on the hub.

5. The hub for use on a supply reel as defined in claim 4 wherein the centering means is a generally frusto-conical shaped member having a generally flat upper surface substantially parallel to the surface of the hub base and further having a portion removed at one corner, the centering means being fixedly attached to the hub base.

6. The hub for use on a supply reel as defined in claim 5 wherein the supply reel has a write enable ring having a tab attached thereto further comprising:
   (a) a groove fixedly attached to the hub base in proximity to the centering means running radially outward; and
   (b) whereby as the tab of the write enable ring becomes caught on the centering means, as the supply reel is rotated the tab of the write enable ring will pass across the groove on the hub base.

7. The hub for use on a supply reel as defined in claim 1 further comprising:
   (g) an additional elongated sensing means positioned on the hub base, the additional elongated sensing means having a sensing protrusion extending partially out of the hub to contact the supply reel in proximity to its central hub to sense the presence or absence of a write enable ring.

8. The hub for use on a supply reel as defined in claim 1 wherein the plurality of signalling means are signalling flags positioned at the rear of the hub.

9. A locking hub system with a locking mechanism for use in locking and unlocking a supply reel on a computer tape drive, the supply reel having an inner circumference with a rim used on a computer tape with a tape drive having a frame, the assembly being used to assure proper alignment of the supply reel on the hub, comprising:
   (a) a drive motor having a shaft for turning the supply reel;
   (b) a hub base having a periphery with a central opening and having means for releasably attaching the shaft of the drive motor to the hub base;
   (c) locking means positioned on the hub base for locking the hub base to the supply reel;
   (d) a plurality of elongated spaced apart sensing means, positioned around the periphery of the hub base in a predetermined position, the elongated sensing means having sensing protrusions extending partially out of the hub to contact the supply reel whenever the reel is properly positioned;
   (e) activating means fixedly attached to the frame and in contact with the locking means for activating the locking means to lock the supply reel onto the hub;
   (f) controlling means associated with the frame for controlling the operation of the computer tape drive;
   (g) a plurality of signalling means, formed on one end of the elongated sensing means for signalling to the controlling means that each of the plurality of sensing protrusions is positioned properly in a predetermined position to indicate that the supply reel is properly aligned, whereby as the supply reel hub is rotated, the plurality of sensing means signal the signalling means;
   (h) receiving means associated with the frame for receiving the signal from each of the signalling means;
   (i) a first transmission means associated with the receiving means for transmitting the plurality of signals from the receiving means to the controlling means; and
   (j) a second transmission means associated with the controlling means and the actuating means for transmitting the plurality of signals from the controlling means to the activating means, whereby the controlling means activates the activating means whenever the plurality of signals have been received indicating that each of the sensing means are in a proper predetermined position.

10. The locking hub system as defined in claim 9 wherein the activating means comprises in part:
   (a) a power supply for applying voltage:
   (b) a solenoid having a solenoid arm associated with the power supply, the solenoid receiving voltage from the power supply;
   (c) an actuator arm associated with the solenoid arm; and
   (d) whereby as voltage is applied to the solenoid, the solenoid arm pushes the actuator arm into engagement with the locking means thereby locking the hub base to the supply reel as the hub rotates.

11. The locking hub system as defined in claim 9 further comprising:
   (k) a display positioned on the frame;
   (l) a third transmission means associated with the controlling means and the display for transmitting the plurality of signals from the controlling means to the display.

12. The locking hub system as defined in claim 11 further comprising:
   (m) a fourth transmission means associated with the controlling means for transmitting the plurality of signals from the controlling means to the computer.

13. The locking hub system as defined in claim 9 wherein the controlling means is a master controller which functions to receive and interpret the plurality of signals from the receiving means and to signal the activating means whenever the plurality of signals have been received indicating that each of the sensing means are in a proper position.

14. The locking hub system as defined in claim 9 wherein the receiving means is an optical interrupter which functions to receive a plurality of signals from the signalling means and to transmit the plurality of signals to the controlling means.

15. The locking hub system as defined in claim 9 wherein the receiving means is an emitter detector which functions to receive a plurality of signals from the signalling means and to transmit the plurality of signals to the controlling means.

16. The locking hub system as defined in claim 9 wherein:
   (k) the locking means of paragraph (c) are used for unlocking the hub base from the supply reel;
   (l) the elongated spaced apart sensing means of paragraph (d) are retracted into the hub to release contact from the supply reel whenever the reel is being removed from the supply reel hub;
   (m) the activating means of paragraph (e) are used for activating the locking means to unlock the supply reel from the hub;
   (n) one of the plurality of signalling means of paragraph (g) signals to the controlling means that each of the plurality of sensing protrusions are properly retracted into the hub; and
   (o) whereby the controlling means activates the activating means whenever the plurality of signals have been received indicating that each of the sensing means are properly retracted into the hub.

* * * * *

UNITED STATES PATENT AND TRADEMARK OFFICE
CERTIFICATE OF CORRECTION

PATENT NO. : 4,735,374
DATED : April 5, 1988
INVENTOR(S) : Douglas R. Domel

It is certified that error appears in the above-identified patent and that said Letters Patent is hereby corrected as shown below:

Column 5, line 5, "80, 2, 84" should read --80, 82, 84--;

Column 6, line 8, "13 of" should read --18 of--;

Column 7, line 46, "suply" should read --supply--;

Column 8, line 4, "singal" should read --signal--;

Column 9, line 18, "activting" should read --activating--.

Signed and Sealed this

Eighteenth Day of October, 1988

Attest:

DONALD J. QUIGG

*Attesting Officer*        *Commissioner of Patents and Trademarks*